United States Patent [19]

Torii et al.

[11] Patent Number: 4,828,094
[45] Date of Patent: May 9, 1989

[54] MOTION RANGE LIMITING APPARATUS FOR INDUSTRIAL ROBOTS

[75] Inventors: Nobutoshi Torii, Hachioji; Ryo Nihei, Musashino; Hitoshi Mizuno, Hino, all of Japan

[73] Assignee: Fanuc Ltd, Minamitsuru, Japan

[21] Appl. No.: 32,455

[22] PCT Filed: Jul. 25, 1986

[86] PCT No.: PCT/JP86/00392
§ 371 Date: Apr. 8, 1987
§ 102(e) Date: Apr. 8, 1987

[87] PCT Pub. No.: WO87/00790
PCT Pub. Date: Feb. 12, 1987

[30] Foreign Application Priority Data

Jul. 29, 1985 [JP] Japan .................. 60-167029

[51] Int. Cl.⁴ .................. B25J 19/00; B25J 9/10
[52] U.S. Cl. .................. 192/139; 192/142 R; 192/149; 901/13
[58] Field of Search .................. 192/138, 139, 142 R, 192/149; 901/13, 11; 74/813 C, 815, 816

[56] References Cited

U.S. PATENT DOCUMENTS

| | | | |
|---|---|---|---|
| 1,170,157 | 2/1916 | Huebner | 192/139 |
| 3,717,231 | 2/1973 | Kaufeldt | 192/139 |
| 3,885,678 | 5/1975 | Borg et al. | |
| 3,954,188 | 5/1976 | Boyle | 901/13 X |
| 4,191,301 | 3/1980 | Hickman et al. | 192/139 X |
| 4,295,555 | 10/1981 | Kamm | 192/139 |

FOREIGN PATENT DOCUMENTS

| | | |
|---|---|---|
| 2213212 | 8/1974 | France . |
| 59-132793 | 9/1984 | Japan . |
| 60-52273 | 3/1985 | Japan . |

Primary Examiner—Rodney H. Bonck
Assistant Examiner—Richard M. Lorence
Attorney, Agent, or Firm—Staas & Halsey

[57] ABSTRACT

An apparatus for limiting range of motion of an industrial robot in accordance with the invention includes an indicating section (7) for indicating e.g. angles of rotation provided on a stationary side (1) of the swivel portion of an axis about which swiveling motion is possible. A range limiting member (6) having a dog and a stopper is movably disposed on the indicating section (7). When the industrial robot attempts to rotate beyond a stipulated range of rotation during operation, a limit member (81) provided on a movable side (2) of the axis portion contacts the dog (61) on the stationary side (1) to detect overtravel, whereby a warning is issued to the effect that the stipulated range of rotation has been exceeded. When the robot attempts to rotate further due to inertia, a shock absorber (82) strikes a stopper mechanism (62) to prevent excessive rotation.

3 Claims, 3 Drawing Sheets

MOTION RANGE LIMITING APPARATUS FOR INDUSTRIAL ROBOTS

DESCRIPTION

1. Technical Field

This invention relates to an industrial robot and, more particularly, to an industrial robot motion range limiting apparatus for limiting the angle of rotation of such a robot.

2. Background Art

An industrial robot comprises a pedestal fixed to a floor or movable along a floor, a $\theta$ axis member rotatably provided on the pedestal, a W axis member swingably attached to the $\theta$ axis member, a U axis member swingably provided on the end of the W axis member, and a wrist provided on the end of the U axis member.

A swiveling portion of each axis member is provided with an overtravel limit switch and stopper mechanism. When each axis member attempts to rotate beyond a stipulated range of rotation, a projecting member provided on one shaft support portion actuates an overtravel detection limit switch provided on another rotary shaft support portion, whereby a warning is issued to the effect that the rotary shaft has rotated in excess of a predetermined angle of rotation. When the rotary shaft rotates further due to inertia or the like, an interference member provided on a rotary portion abuts against a stopper provided on the other shaft support portion to prevent any further rotation.

In the conventional motion range limiting apparatus described above, the stopper mechanisms are mounted at positions which depend upon the manner in which the robot is used and the rotational angles of the robot. Like the stopper mechanisms, the projecting members for detecting overtravel also are mounted at positions which depend upon the rotational angles of the robot. However, the positions at which these stopper mechanisms and projecting members are mounted do not have marks for indicating the mounting position and considerable labor is required to set the positions.

The present invention has been devised to improve upon the foregoing drawbacks of the prior art and the object thereof is to provide an industrial robot motion range limiting apparatus in which the mounting position of a mechanism, including a stopper mechanism, provided at a rotating shaft support portion of the industrial robot for limiting the range of rotation of the robot can be changed in a simple manner, and in which the mounting position is clearly indicated.

SUMMARY OF THE INVENTION

The present invention provides an apparatus for limiting range of motion of an industrial robot having an axis whose range of motion can be limited. A range limiting member provided with an overtravel detecting dog and a stopper is movably attached to a stationary side of an axis member portion about which swiveling motion is possible. Provided on the movable side of the axis member portion about which swiveling motion is possible is a fixed member having a limit member for detecting overtravel when it contacts the dog and a projection for preventing excessive swiveling about the axis member when it strikes the stopper mechanism. An indicating section for clearly indicating setting positions is provided on a portion at which the range limiting member is attached.

According to the invention, there is provided an industrial robot motion range limiting apparatus in which the projection of the fixed member comprises a shock absorber consisting of rubber.

When the industrial robot attempts to rotate beyond a stipulated range of rotation during operation, the limit member provided on the movable side of the axis member portion contacts the dog on the stationary side to detect overtravel, whereby a warning is issued to the effect that the stipulated range of rotation has been exceeded. When the robot attempts to rotate further due to inertia, the shock absorber strikes the stopper mechanism to prevent excessive swiveling.

DESCRIPTION OF THE PREFERRED EMBODIMENT

An embodiment of the present invention will now be described in detail with reference to the drawings.

Figure 2:
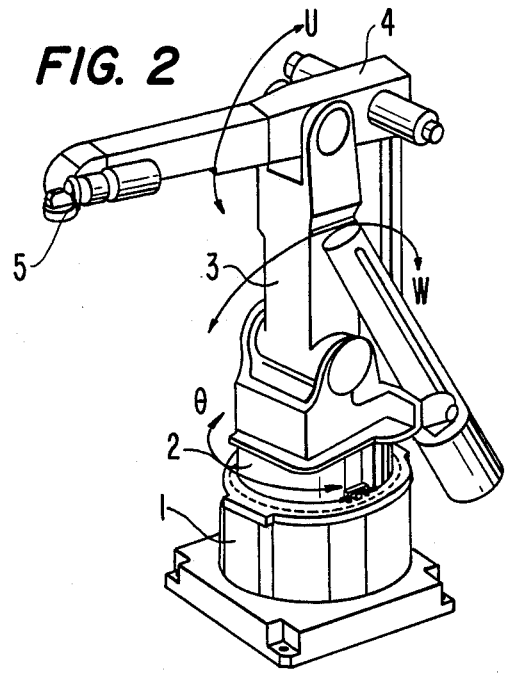
FIG. 2 is a perspective view illustrating the entirety of an industrial robot provided with the present embodiment.

FIG. 2 illustrates an industrial robot. Numeral 1 denotes a stationary side of a $\theta$ axis member of the industrial robot, which is fixed to a floor. Mounted on the upper portion of the stationary side is a movable side 2 of the $\theta$ axis member, about which rotation is capable within a predetermined range. Provided on the movable side 2 of the $\theta$ axis member is a W axis member 3 capable of swinging back and forth within a predetermined range of rotation. A U axis member 4 capable of swinging back and forth within a predetermined range of rotation is provided on the distal end of the W axis member 3. A wrist 5 is provided on the distal end of the U axis member 4.

Figure 1:
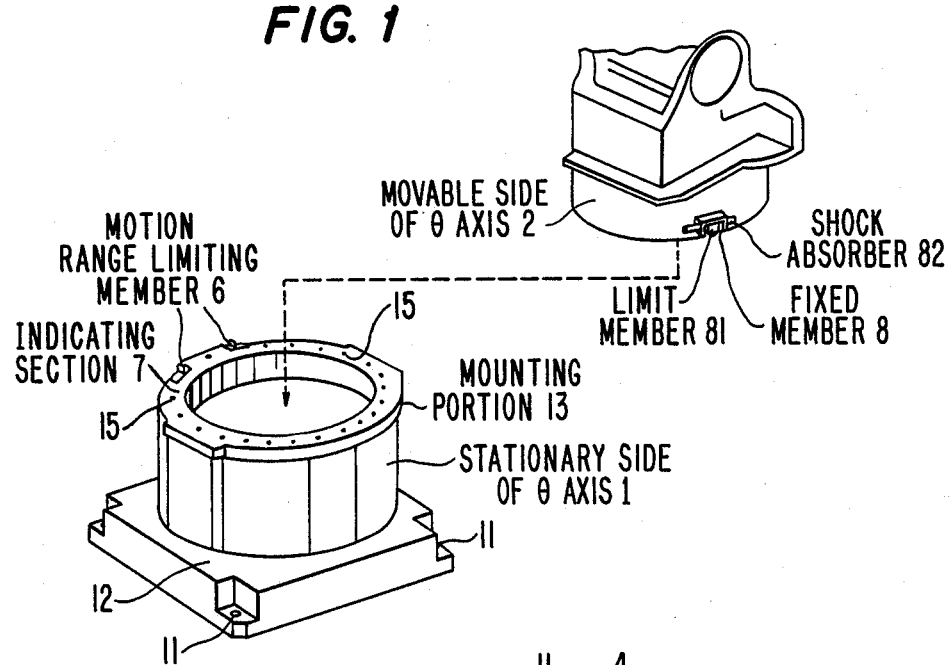
FIG. 1 is an exploded perspective view illustrating an embodiment of an apparatus for limiting the motion range of an industrial robot according to the present invention.

In FIG. 1, a pedestal 12 having a plurality of bolt holes 11 for securing the pedestal is disposed on the lower portion of the stationary side 1. The latter constitutes an annular cylinder the upper face of which has a mounting portion 13 forming a swiveling portion with the movable side 2. The mounting portion 13 has indications 14 (FIG. 3) indicating the rotational angle of the $\theta$ axis, and screw holes 15 for fixing range limiting members 6 (FIG. 4), described below. Thus is formed an indicating section 7 (FIG. 4).

Figure 3:
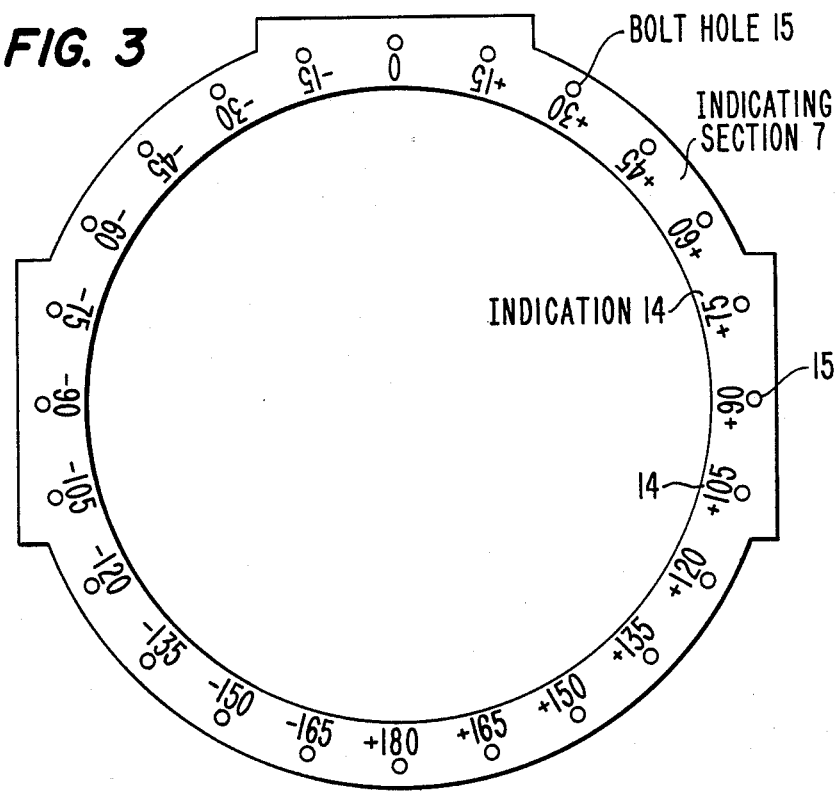
FIG. 3 is a top view of an indicating section of the present embodiment.
Figure 4B:
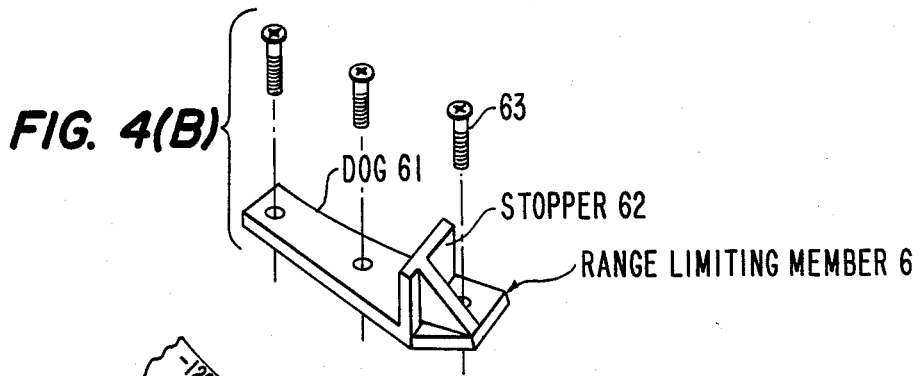
FIG. 4 is a partially enlarged perspective view of the indicating section.
Figure 4A:
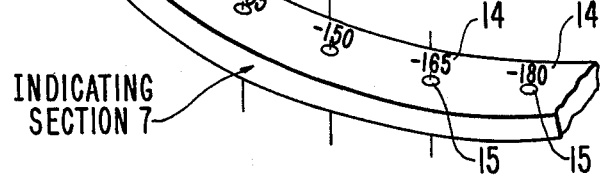

FIG. 3 is a top view of the indicating section 7, and FIG. 4(A) is a partially enlarged perspective view of the indicating section 7. By way of example, angles of rotation about the $\theta$ axis member are indicated every 15°, and the screw holes 15 for fixing the range limiting members 6 are provided every 15° at positions corresponding to the angle indications.

FIG. 4(B) is a perspective view of one of the range limiting members 6, which is provided with an overtravel detection dog 61 and a stopper mechanism 62.

The range limiting member 6 can be attached to any position on the indicating portion 7 by screws 63 and can be moved by removing the screws.

Figure 5:
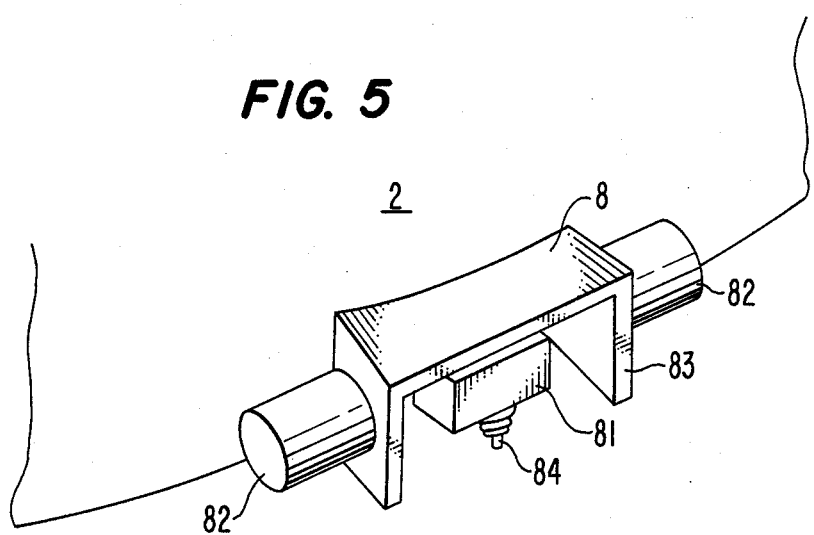
FIG. 5 is a perspective view illustrating a fixed member of the present embodiment.

FIG. 5 is a perspective view of a fixed member 8 provided on the movable side 2 of the $\theta$ axis member. The fixed member 8 has a limit member 81 which detects overtravel when it contacts the dog 61, and a shock absorber 82 which prevents excessive swiveling when it strikes the stopper mechanism 62. The shock absorber 82 consists of e.g. a cylindrical piece of hard rubber and is affixed to both sides of a fixed frame 83 so as to project therefrom. The limit member 81 is constituted by e.g. a microswitch (a switch for detecting overtravel and referred to as an "OT" switch hereinafter) for sensing contact even with a small projection to open and close an electric circuit. A portion 84 for detecting such contact is attached to the fixed frame 83 so as to detect the presence of the dog 61 on the indicating section 7. The fixed frame 83 having the projecting shock absorbers 82 on both its sides is attached to the outer side of the swiveling portion of the movable side 2 and has enough strength to prevent excessive swiveling of the movable side 2 when one of the shock absorbers 82 strikes the stopper mechanism 62.

Figure 6:
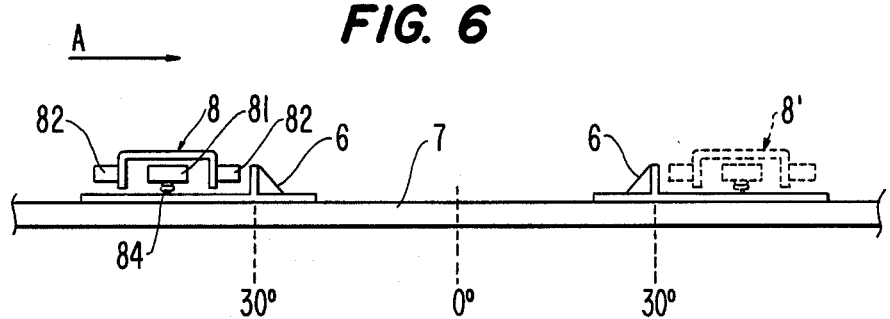
FIG. 6 is a view for describing the operation of the present embodiment.

The operation of the present embodiment having the foregoing construction will now be described. In an industrial robot in which the motion range of the $\theta$ axis member is a rotational angle of e.g. 300°, the motion range limiting members 6 are attached to the indicating portion 7 in such a manner that the respective stoppers 62 will be situated at positions 30° to the left and right of 0°, as shown in FIG. 6. In the drawings, the movable side 2 rotates counter-clockwise, i.e. the fixed member 8 provided on the movable side 2 travels in the direction of arrow A. In the course of such movement, the detecting portion 84 of limit member 81 first detects the left end of dog 61 to actuate the OT switch, whereby control is performed to halt rotation of the movable side 2. Due to inertia and the like, the movable side 2 does not come to rest immediately but continues rotating through a predetermined angle and stops when the shock absorber 82 strikes the stopper mechanism 62. This prevents the movable side from traveling beyond the range of motion.

In FIG. 6, numeral 8' denotes the position of the fixed member when the movable side 2 rotates clockwise so that the fixed member 8 approaches from the right side of FIG. 6. Excessive swiveling of the movable side 2 is prevented by abutting contact between the stopper mechanism 62 and shock absorber 82, just as set forth above.

In the foregoing description, the range of motion of the $\theta$ axis member is taken as being a rotational angle of 300°. Accordingly, the range limiting members 6 are attached at positions 30° to the left and right of 0°, as shown in FIG. 6. However, since the indications 14 and screw holes 15 are provided on the indicating section 7, it is possible to provide the range limiting members 6 at any desired positions.

Though the present invention has been described based on an embodiment thereof, the invention can be modified in various ways without departing from the scope of the claims.

In the industrial robot motion range limiting apparatus of the present invention, range limiting members having a dog for limiting motion range and a mechanism for preventing excessive swiveling are provided on a rotating shaft support portion of the industrial robot. Also provided on the support portion is an indicating section which enables the limiting members to be mounted at desired positions which are clearly marked. If the range of motion is set in accordance with the indicating section, the range of motion of the industrial robot can be limited easily and reliably without labor.

We claim:

1. An apparatus for limiting range of motion of an industrial robot having an axis portion whose range of motion can be limited, comprising:
    a range limiting member, which comprises an overtravel detecting dog and a stopper, movably provided on a stationary side of the axis portion about which swiveling motion is possible;
    a fixed member provided on a movable side of the axis portion about which swiveling motion is possible, and positioned so as to detect overtravel when it contacts said dog and to prevent excessive swiveling about said axis when it strikes said stopper;
    a limit member positioned at a midpoint of said fixed member so as to initiate stopping of swiveling motion when said limit member contacts said dog; and
    an indicating section provided on a portion at which said range limiting member is attached for indicating a position at which said range limiting member is set.

2. An apparatus for limiting range of motion of an industrial robot according to claim 1, wherein that said fixed member comprises, on the movable side of the axis portion about which swiveling motion is possible, a projection positioned to prevent swiveling about said axis when it strikes said stopper.

3. An apparatus for limiting range of motion of an industrial robot according to claim 2, characterized in that the projection of said fixed member comprises a shock absorber consisting of rubber.

* * * * *